United States Patent Office 2,785,429
Patented Mar. 19, 1957

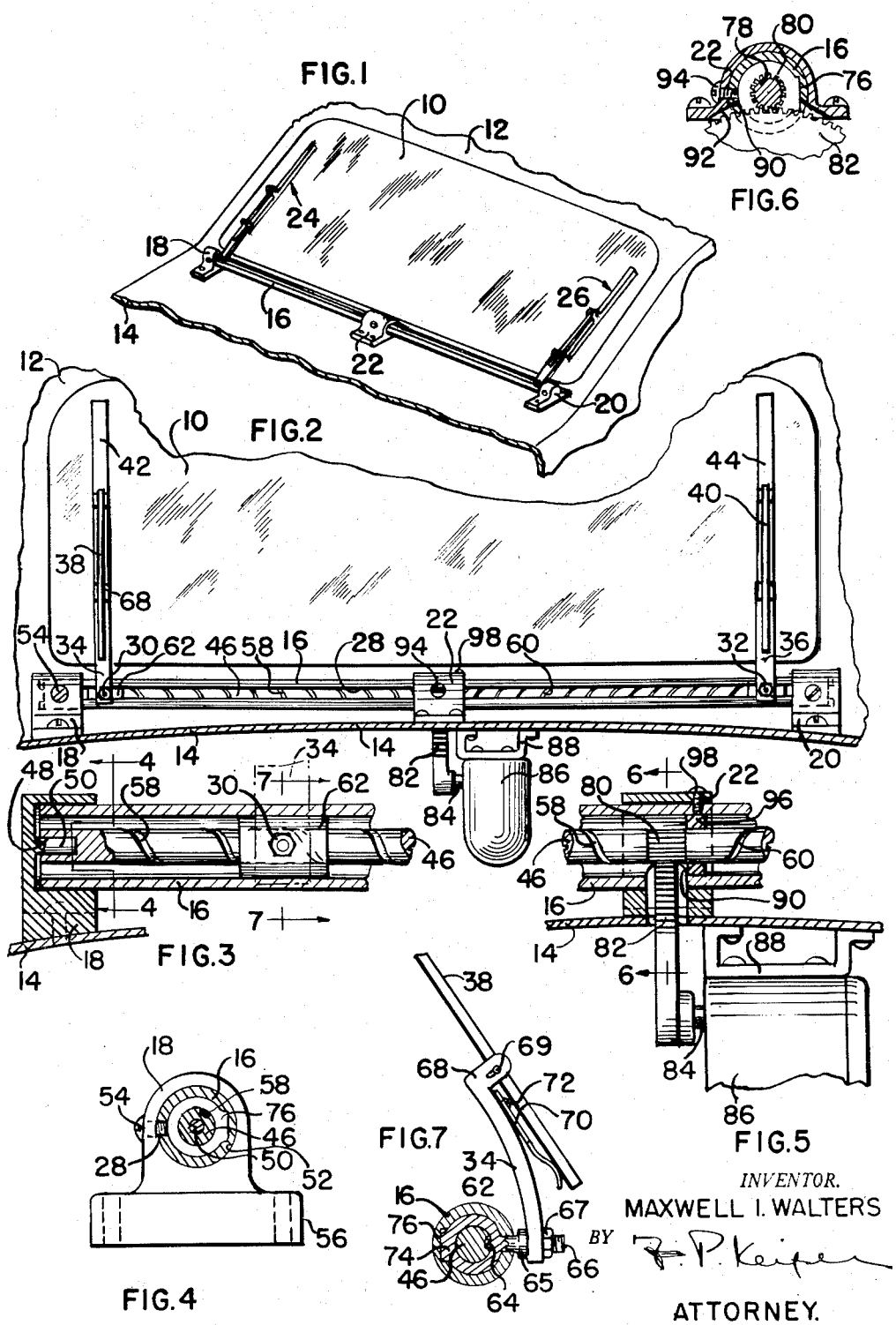

2,785,429

WINDSHIELD WIPER MECHANISMS

Maxwell I. Walters, Rochester, N. Y.

Application June 2, 1955, Serial No. 512,662

2 Claims. (Cl. 15—253)

This invention relates to windshield wiper operating mechanism, and more particularly to mechanism adapted to provide rectilinear wiper blade movement.

The present invention is directed to a wiper mechanism employing a tubular housing extending crosswise of the cowl just below and immediately forward of the windshield, in which there is provided a shaft having helical cam grooves adapted to move a wiper carrying sleeve lengthwise of the housing in response to rotation of the shaft, the rotation of the shaft being periodically reversed to provide suitable reciprocating motion of the wiper blades.

It is an object of the invention to provide a mechanism of the character set forth in which rectilinear motion of the wiper blades may be had for clearing a maximum or rectangular area of the windshield.

Another object of the invention is to provide a mechanism of the character referred to in which the moving parts are reduced to a shaft, wiper blade supports mounted thereon and a tubular housing which acts as a guide for the movement of the supports.

A further object of the invention is to provide a mechanism of the character set forth which may be readily assembled in position upon the cowl of a motor vehicle, and which may be driven by a conventional vacuum motor having an oscillating shaft.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a fragmentary perspective view of a windshield with the operating mechanism located in reference thereto;

Figure 2 is an enlarged front elevational view, with parts in section, of the mechanism;

Figure 3 is a vertical axial sectional view through an end mount of the mechanism;

Figure 4 is a transverse sectional view of the end mount taken substantially on the broken line 4—4 of Figure 3;

Figure 5 is a fragmentary vertical axial sectional view through the center mount and motor drive gears;

Figure 6 is a sectional view taken on the line 6—6 of Figure 5; and

Figure 7 is a sectional view taken substantially on the line 7—7 of Figure 3.

In Figure 1, there is shown a motor vehicle windshield 10 mounted in a frame 12 which forms an upward slanting extension of the engine cowling 14. Immediately in front of, and along the lower edge of the windshield, there is mounted a tubular housing 16, extending between end brackets 18 and 20, and supported at the center by a center bracket and drive gear housing 22. Windshield wipers 24 and 26 adapted for rectilinear movement to clear rectangular areas of the windshield 10 are provided.

As shown in Figure 2, the tubular housing 16 has a lengthwise extending slot 28 which extends from bracket 18 to bracket 20, such tubular member extending through the center bracket 22. Projecting through the slot are threaded studs 30 and 32 on which are mounted arms 34 and 36 which carry the wiper blade supporting arms 38 and 40, and blades 42 and 44.

In Figures 3 and 7, it will be seen that within the tubular housing there is arranged concentrically in respect thereto, a shaft 46, such shaft extending from the end bracket 18 to the end bracket 20. The shaft in its opposite ends is counter bored as at 48, and is journalled on a stub shaft 50 formed integral within the end brackets 18 and 20. Each of the end brackets 18 and 20 are provided with a circular recess 52 adapted to receive the end of the housing 16, and such housing is keyed in place within the bracket by a screw such as 54 which is aligned to wedge into the slot 28. The brackets have mounting feet 56 for securing the same to the cowl 14.

The shaft on its opposite ends is provided with helical cam grooves 58 and 60, the grooves being of opposite pitch. Threaded on each shaft end, is a collar or sleeve 62, which makes a close running fit within the tubular housing 16 and upon the shaft 46. Each of the collars are provided with a finger 64 which projects into the respective cam grooves 58 and 60, and an oppositely projecting stud 66 adapted to project through the slot 28, such stud having a shoulder 65, and threaded shank upon which is rigidly mounted an arm such as 34 or 36, the arm being clamped by a nut 67. The arm may curve rearwardly toward the windshield, as shown in Figure 7, and be provided with spaced ears 68 to form a trunnion bearing 69 for the wiper blade supporting arms such as 38 or 40. A leaf spring 70 secured to the arm 34 as at 72 projects downwardly and forwardly to resiliently bear against the lower end of the wiper supporting arm 38 whereby yielding pressure is applied to the wiper blades to cause the same to engage the windshield under suitable pressure, and follow any varying contour of the windshield.

The collars are each provided with rectangular bosses 74 which ride in a flat rectangular sectioned groove 76 extending lengthwise of the tubular housing 16, such groove preferably being located opposite the slot whereby the same may be milled by access through the slot.

At the center of the shaft there is provided a pinion section 78 having pinion teeth 80 adapted to mesh with the teeth of an oscillating sector gear 82 mounted on the oscillating shaft 84 of a suction operated motor of the standard well known type, such suction motor 86 being mounted on a suitable bracket 88 below the cowl 14. The tubular housing is cut away as at 90 to provide entrance of the sector gear 82, and the center bracket 22 is cut away as at 92 and provides a suitable housing for the gear and pinion. The housing is keyed within the center bracket by a screw 94 entering the slot 28 of the sleeve.

It will be seen from the foregoing that the various parts are readily assembled, the housing 16 being slid into the center bracket 22, after which the shaft is extended through the housing, and the collars 62 applied to the opposite ends. Thereafter the end brackets are mounted in position, and the assembly secured to the cowl. Thereafter the drive motor and sector gear are mounted beneath the cowl, with the gear projecting into the housing in mesh with the pinion. If desired, a bearing sleeve 96 may be located within the tubular housing 16 and within the center bracket 22 to provide support for side thrust of the shaft 46, such sleeve being held in position by a set screw 98.

It will be appreciated that a single sleeve such as 96 will allow entrance of the shaft from one end, in any event, should the pinion teeth project beyond the diameter of the shaft proper. In practice the slot 26 may face downwardly or rearwardly if desired, in which case it will be protected from the weather, it being merely necessary to shape the arms 34 and 36 so as to be supported from the studs 66 of the sleeves. The ratio of the diameters of the pinion and sector gear will be so correlated with the pitch of the helical grooves and the length thereof as to give full travel of the sleeves 62 between the end brackets 18 and 20 and the center bracket 22. While a suction operated motor has been referred to of the oscillating drive shaft type, any motor providing a periodically reversing drive may be employed, as will be appreciated by those skilled in the art. If desired the arms 34 and 36 may be offset slightly toward one another so as to support the wiper blades in a manner such that the wiper blades will meet at the center when travelling toward one another.

While the invention has been illustrated and described with reference to a single embodiment thereof, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A windshield wiper mechanism comprising a tubular housing having a slot extending lengthwise thereof, a bracket for said housing at each end thereof having a socket recess to receive said housing, means cooperating with said slot to key said housing to said brackets, a shaft extending lengthwise within said housing coaxial therewith, means to journal the ends of said shaft on said brackets, a helical cam slot in each end of said shaft extending substantially one half the length thereof, a sleeve on each end of said shaft and within said housing and embracing said shaft for movement thereon each sleeve having a finger extending into their respective said cam slots and a wiper blade supporting arm mounting stud projecting outwardly through said housing slot from each of said sleeves, gear teeth formed in a central portion of said shaft, and drive mechanism including a toothed member meshing with said gear teeth and mounted laterally with respect to said housing, said housing being cut away adjacent said gear teeth to provide access thereto by said toothed member.

2. A windshield wiper mechanism comprising a tubular housing having a slot extending lengthwise thereof, a bracket for said housing at each end thereof having a socket recess to receive said housing, means cooperating with said slot to key said housing to said brackets, a shaft extending lengthwise within said housing coaxial therewith, means to journal the ends of said shaft on said brackets, helical cam slots of opposite pitch in said shaft on the opposite ends thereof, each cam slot extending substantially one half the length of the shaft, a sleeve within said housing embracing said shaft at each end thereof for movement thereon, each of said sleeves having a finger engaging the respective helical slot, and a wiper blade supporting arm mounting stud projecting outwardly through said housing slot, gear teeth formed on a central section of said shaft, between the opposite helically grooved ends, a center bracket for said tubular housing, said bracket and tubular housing being cut away on one side adjacent said gear teeth, and an oscillating motor mounted in operative relation to said center bracket having a sector gear projecting into the cut away side of said center bracket and housing and meshing with said gear teeth.

References Cited in the file of this patent
UNITED STATES PATENTS

| | | |
|---|---|---|
| 1,293,759 | Groot | Feb. 11, 1919 |
| 1,806,336 | Critchfield | May 19, 1931 |
| 1,902,610 | Bessy | Mar. 21, 1933 |